United States Patent
Yan et al.

(10) Patent No.: US 11,234,571 B2
(45) Date of Patent: Feb. 1, 2022

(54) CLEANING ROBOT AND MATERIAL IDENTIFICATION METHOD THEREOF

(71) Applicants: Jason Yan, New Taipei (TW); Shui-Shih Chen, New Taipei (TW)

(72) Inventors: Jason Yan, New Taipei (TW); Shui-Shih Chen, New Taipei (TW)

(*) Notice: Subject to any disclaimer, the term of this patent is extended or adjusted under 35 U.S.C. 154(b) by 362 days.

(21) Appl. No.: 16/584,869

(22) Filed: Sep. 26, 2019

(65) Prior Publication Data

US 2021/0038040 A1    Feb. 11, 2021

(30) Foreign Application Priority Data

Aug. 7, 2019    (TW) .................................. 108128007

(51) Int. Cl.
  *A47L 9/28*      (2006.01)
  *A47L 11/40*     (2006.01)
  *G05D 1/02*      (2020.01)

(52) U.S. Cl.
  CPC ........... *A47L 9/2826* (2013.01); *A47L 9/2852* (2013.01); *A47L 11/4011* (2013.01); *A47L 11/4066* (2013.01); *G05D 1/0255* (2013.01); *A47L 2201/04* (2013.01); *G05D 2201/0203* (2013.01)

(58) Field of Classification Search
  CPC .. A47L 9/2826; A47L 9/2852; A47L 11/4011; A47L 11/4066; A47L 2201/04; A47L 9/2847; A47L 2201/06; A47L 11/4061; A47L 7/02; A47L 11/4063; G05D 1/0255; G05D 2201/0203
  See application file for complete search history.

(56) References Cited

U.S. PATENT DOCUMENTS

| | | | | |
|---|---|---|---|---|
| 5,541,831 A * | 7/1996 | Thomas | ........... | G05B 19/41875 700/28 |
| 5,943,231 A * | 8/1999 | Thomas | ........... | B03B 4/02 700/28 |
| 6,343,234 B1 * | 1/2002 | Thomas | ........... | B07B 11/04 700/28 |
| 6,351,676 B1 * | 2/2002 | Thomas | ........... | G05B 19/41875 700/28 |
| 2021/0038040 A1 * | 2/2021 | Chen | ........... | G05D 1/0255 |

FOREIGN PATENT DOCUMENTS

CN    200480036904.4 A    1/2007

* cited by examiner

*Primary Examiner* — Bhavesh V Amin
(74) *Attorney, Agent, or Firm* — Chun-Ming Shih; HDLS IPR Services

(57) ABSTRACT

The invention relates to a cleaning robot and a material identification method thereof, which is suitable for cleaning robots. The cleaning robot is pre-set with a threshold comparison table and comprises a plurality of comparison thresholds, wherein each comparison threshold defines an interval of accumulated energy information accumulated by the moving plane of different materials within a predetermined period of time. The cleaning robot generates accumulated energy information during the movement, so that the cleaning robot can find the comparison threshold corresponding to the accumulated energy information from the threshold comparison table, and then determines the material of the moving plane contacted by the cleaning robot.

10 Claims, 3 Drawing Sheets

CLEANING ROBOT AND MATERIAL IDENTIFICATION METHOD THEREOF

BACKGROUND OF THE INVENTION

Field of the Invention

The invention relates to a cleaning robot, in particular to a cleaning robot which can determine the material of the plane touched by the cleaning robot.

Description of the Prior Art

Automatic cleaning devices have developed very rapidly and are very popular in recent years. In terms of cleaning robots, manufacturers of cleaning robots have proposed various solutions for different usage scenario. For example, cleaning robots can use ultrasonic waves to judge the material of the moving plane in different contact planes. When the cleaning robot determines that it is moving on the carpet, the cleaning robot will increase the moving horsepower of the wheel, and when the cleaning robot returns from the carpet to the normal hard floor, the cleaning robot will resume normal horsepower for operation.

However, the above-mentioned cleaning robot may fail to accurately determine the material of the moving plane when using ultrasonic waves. Therefore, some people have tried to fix the problem and applied for a patent, such as the China patent No. CN1889882A, which proposes a floor cleaning device having a floor detecting component for determining the material of the floor by detecting the slip amount or running resistance of one or more displacement wheels, and thereby changing the moving and cleaning modes. However, the problem with this technique is that once the displacement wheels are stuck, rather than the material of the real ground changes, there could be false judgments and unsuitable modes converted for the floor cleaning device.

Another method for detecting the material is by using infrared rays, but since infrared rays are relatively easily affected by the intensity of the ambient light and large blind spot occurs when the distance is too close, the infrared detection method often fails or erroneously judges the material due to the aforementioned external factors when judging the material, so that the automatic cleaning device could be turned into an inappropriate mode.

From the above, the prior-art automatic cleaning device has considerable room for improvement in determining the material of the contact plane.

SUMMARY OF THE INVENTION

In view of the problems of the prior-art technique, it is an object of the present invention is to improve the accuracy of the cleaning robot when determining the material of the moving plane, and to reduce the problem caused by the judgment error. Further, when the cleaning robot determines the material of the moving plane, it can effectively control the moving horsepower and the suction to improve the efficiency of the cleaning robot.

According to an object of the present invention, a material identification method is provided and is suitable for a cleaning robot. The cleaning robot is disposed with a storage module, an ultrasonic module, a moving unit, and a processing module, wherein the storage module is pre-set with a threshold comparison table. The threshold comparison table is pre-set with a plurality of comparison thresholds, and each one of the comparison thresholds is an interval of accumulated energy information accumulated by a material of a moving plane for a predetermined period of time. The moving unit is disposed at the bottom of the cleaning robot, and the processing module is connected to the storage module, the ultrasonic module, and the mobile unit. The material identification method comprises the following steps: the ultrasonic module emits the ultrasonic signal to the moving plane contacted by the moving unit, and the ultrasonic module receives the ultrasonic reflection signal from the moving plane that reflects the ultrasonic signal, the ultrasonic module converts the ultrasonic reflection signal into an energy information, the processing module accumulates all energy information within a predetermined period of time to form an cumulative energy information, the processing module determining, according to the threshold comparison table, whether the accumulated energy information corresponds to one of the comparison thresholds, and determining the material of the moving plane contacted by the moving unit.

The threshold comparison table is respectively provided with a horsepower control information and a suction control information, and after the processing module determines the material of the moving plane contacted by the moving unit, the processing module sends a horsepower control signal corresponding to the horsepower control information b according to the horsepower control information corresponding to the comparison threshold, wherein the moving unit changes the horsepower according to the horsepower control signal.

According to an object of the present invention, a cleaning robot comprises a body, a storage module, a moving unit, an ultrasonic module, and a processing module. The storage module is disposed in the body and is preset with a threshold comparison table. The threshold comparison table is pre-set with a plurality of comparison thresholds, each comparison threshold is an interval of a cumulative energy information accumulated by a material of the moving plane for a predetermined period of time. At least one moving unit is disposed at a bottom of the body, the moving unit drives the body to move and contacts a moving plane. The ultrasonic module is disposed at a position of the body facing the moving plane, the ultrasonic module emits an ultrasonic signal to the moving plane, and receives an ultrasonic reflection signal from the moving plane that reflects the ultrasonic signal. The ultrasonic module converts the ultrasonic reflection signal into an energy information. The processing module is disposed in the body, and is connected to the storage module, the moving unit, and the ultrasonic module, the processing module receives all the energy information in the predetermined period of time, and calculates the accumulated energy information accumulated by all the energy information in the predetermined period of time, and finds out one of the comparison thresholds corresponding to the accumulated energy information according to the threshold comparison table, and determining the material of the moving plane contacted by the moving unit, and the processing module sends a horsepower control signal to the moving unit, so that the moving unit changes the horsepower according to the horsepower control signal.

The position of the body facing the moving plane is a front edge of the body or a front edge of the bottom.

The threshold value of the threshold comparison table in the storage module is respectively provided with a horsepower control information, and the processing module sends a horsepower control signal corresponding to the horsepower control information to the moving unit according to the horsepower control information. The moving unit changes the horsepower according to the horsepower control signal.

The cleaning robot comprises a cleaning module, wherein the cleaning module is disposed at the bottom of the body and is connected to the processing module for cleaning the moving plane below the body.

The threshold value of the threshold comparison table in the storage module is further provided with a suction control information respectively, and the processing module sends a suction control signal corresponding to the suction control information to the cleaning module according to the suction control information, the cleaning module changes the suction according to the suction control signal.

The energy information can be a voltage value or a current value, the accumulated energy information can be an accumulated voltage value or an accumulated current value.

As described above, the invention has one or more of the following features:

1. The cleaning robot determines the material of the moving plane from the accumulated energy information and the threshold comparison table, thereby improving the misjudgment problem of prior-art ultrasonic technique.

2. The cleaning robot determines the material of the moving plane from the accumulated energy information in the predetermined period of time, which not only improves the aforementioned problem, but also improves the problem of detecting the slip amount or the traveling resistance of the one or more displacement wheels.

3. The present invention uses the reflected energy information of the ultrasonic wave to determine the material, and also improves the problem that the infrared light is easily affected by the ambient light and causes the large blind spot, and the present invention also provides the material judgment function that the prior-art infrared technique does not have.

DETAILED DESCRIPTION OF THE PREFERRED EMBODIMENT

Figure 1:
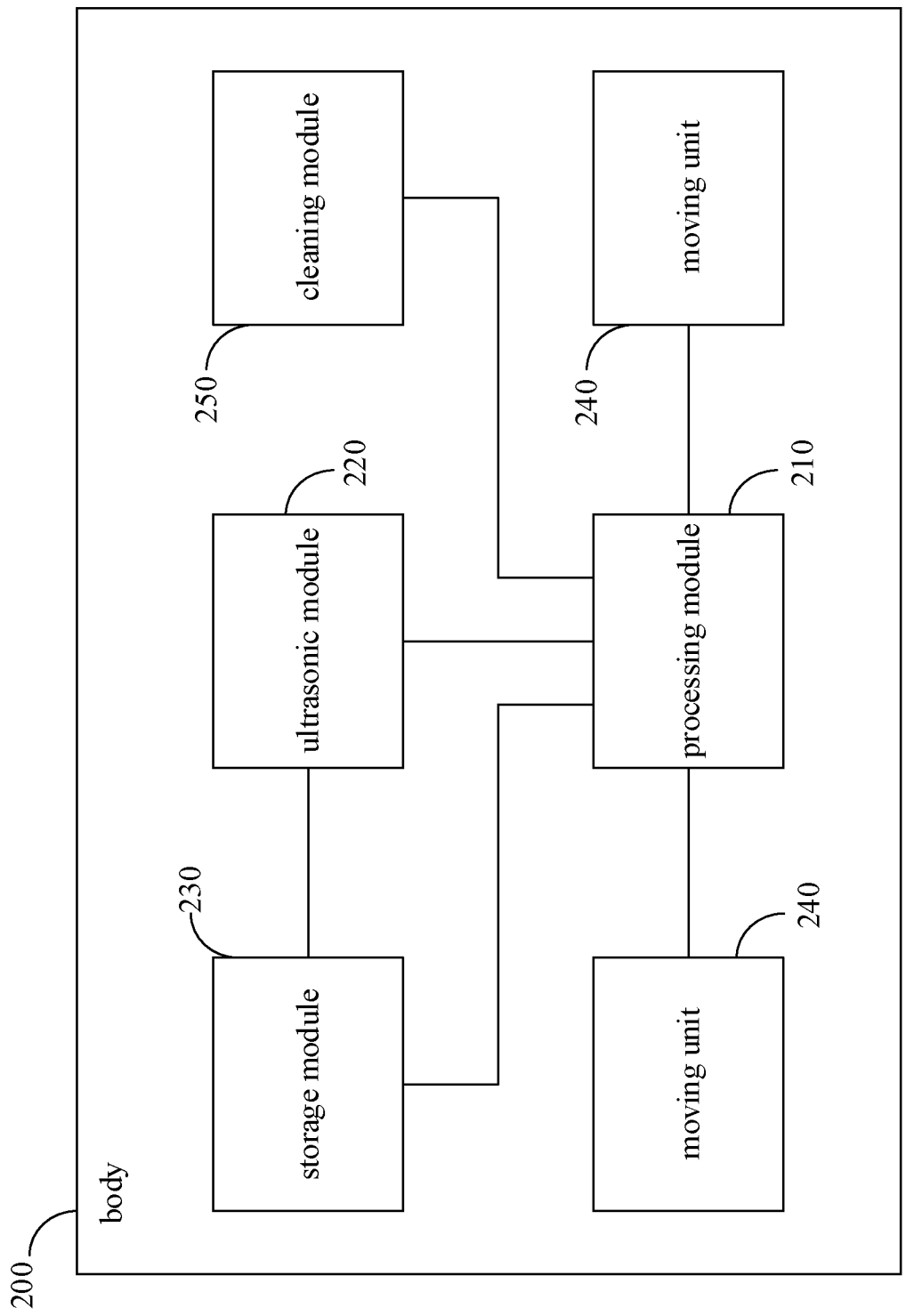
FIG. 1 illustrates a schematic flow diagram of the material identification method of the present invention.

Referring to FIG. 1, the present invention provides a material identification method and is suitable for a cleaning robot. The cleaning robot is disposed with a body 200, a processing module 210, an ultrasonic module 220, a storage module. 230, a moving unit 240, and a cleaning module 250, the ultrasonic module 220 is disposed at a position where the body 200 can detect a moving plane in the moving direction, and the moving unit 240 is disposed at the bottom of the body 200 for driving the body 200 to moved, the cleaning unit 250 is disposed at a position at the bottom of the body 200 facing the moving plane for cleaning the moving plane. Furthermore, the processing module 210 is electrically connected to the ultrasonic module 220, the moving unit 240, the cleaning unit 250, and the storage module 230.

Besides, the storage module 230 is pre-set with a threshold comparison table. The threshold comparison table is pre-set with a plurality of comparison thresholds, and each one of the comparison thresholds is an interval of accumulated energy information accumulated by a material of a moving plane for a predetermined period of time. The interval of accumulated energy information is generated by placing the cleaning robot on the moving plane of a material, and the ultrasonic module 220 emits the ultrasonic signal on the moving plane, and then receives the ultrasonic reflection signal formed by the reflection of the ultrasonic signal from the moving plane for a predetermined period of time by the ultrasonic module 220, the ultrasonic reflection signal is converted into an energy information, and the accumulated energy information is cumulatively generated, and the accumulated energy information is obtained after performing multiple tests according to the foregoing manner From the accumulated energy information obtained for multiple times, the highest accumulated energy information and the lowest accumulated energy information are used as the interval of accumulated energy information, or the average value of the accumulated energy information with a certain ratio of error values added are used as the interval of accumulated energy information, but the present invention is not limited thereto, and it is within the scope of the present invention as long as the interval of accumulated energy information can be used to determine a material of the moving plane.

Figure 2:
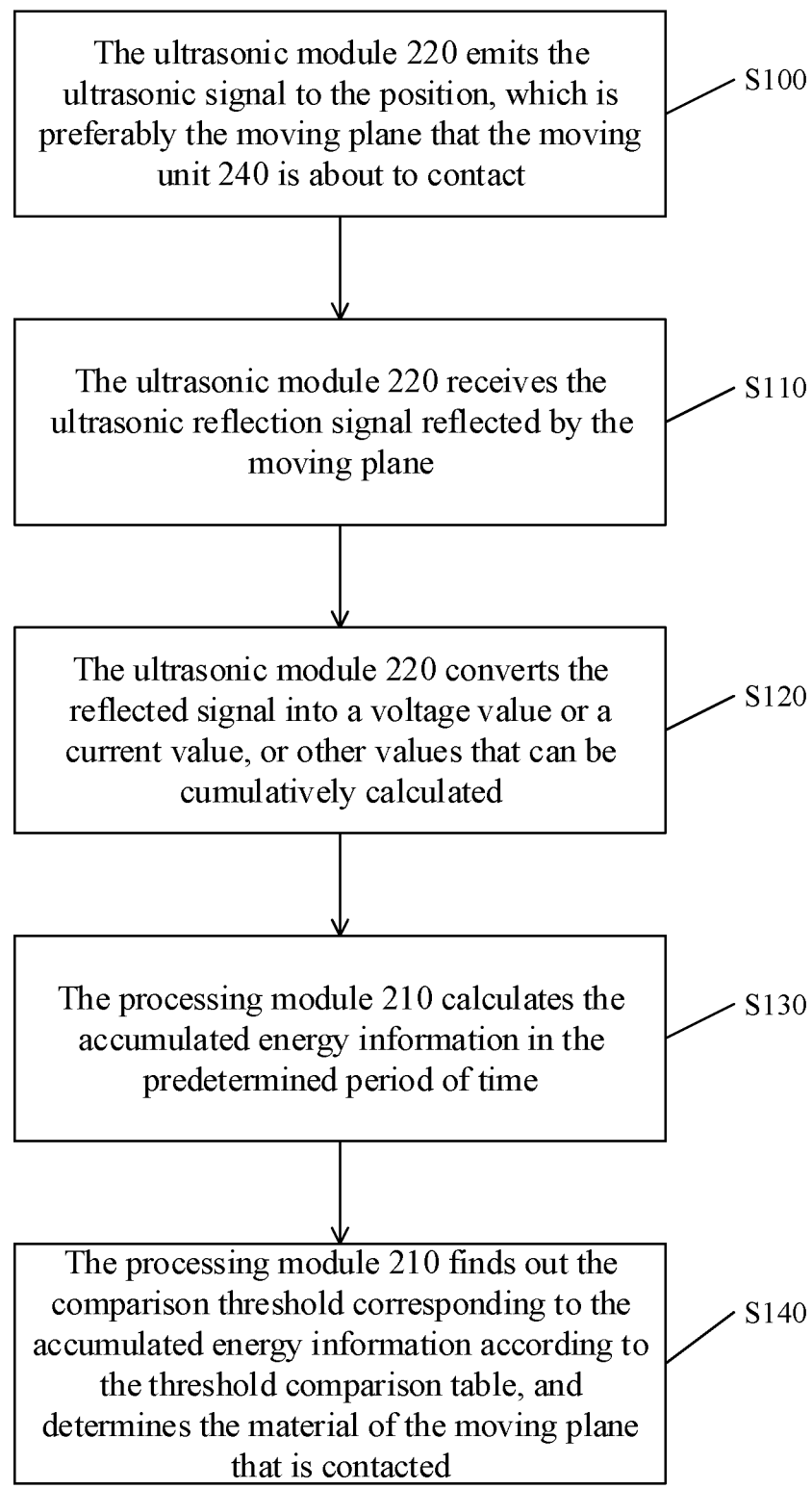
FIG. 2 illustrates another schematic flow diagram of the material identification method of the present invention.

As shown in FIG. 2, the material identification method of the present invention comprises the following steps:

S100: When the cleaning robot is driven by the moving unit 240 and moves on the moving plane, the ultrasonic module 220 emits the ultrasonic signal to the moving plane, and the ultrasonic module 220 emits the ultrasonic signal to the position, which is preferably the moving plane that the moving unit 240 is about to contact;

S110: The ultrasonic module 220 receives the ultrasonic reflection signal reflected by the moving plane;

S120: The ultrasonic module 220 converts the reflected signal into energy information. In the present invention, the ultrasonic module 220 converts the reflected signal into a voltage value or a current value, or other values that can be cumulatively calculated;

S130: The processing module 210 calculates the accumulated energy information in the predetermined period of time, wherein the predetermined period of time is set by the processing module 210 to collect the energy information of the ultrasound module emitting the ultrasonic signal or receiving the ultrasonic signal in that period, and the processing module 210 can increase or decrease the predetermined period of time. For example, the processing module 210 sets the predetermined period of time to one second, that is, the processing module 210 obtains all the energy information every one second from the ultrasonic module 220, and then converts the accumulated energy information and compares the comparison thresholds in the threshold comparison table to determine the material of the moving plane contacted by the moving unit 240; and S140: The processing module 210 finds out the comparison threshold corresponding to the accumulated energy information according to the threshold comparison table, and determines the material of the moving plane that is contacted.

Figure 3:
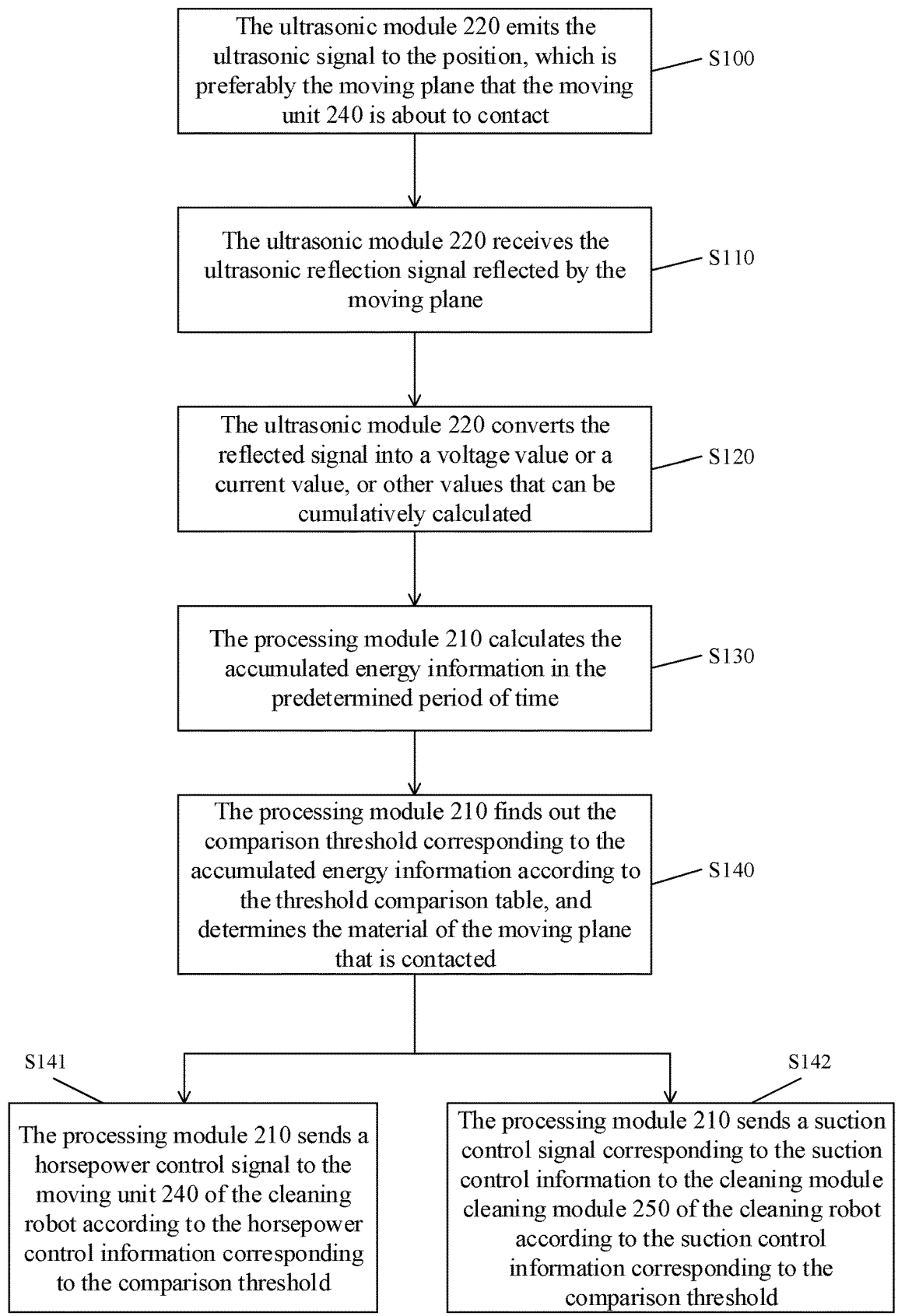
FIG. 3 illustrates a schematic view showing an embodiment of the device of the present invention.

As shown in FIG. 3, the horsepower control information and the suction control information are respectively set for the corresponding comparison thresholds in the threshold comparison table, and the horsepower control information is the horsepower to be output by the moving unit 240, and the suction control information is the magnitude of the suction to be output by the cleaning unit, and after step S140, the following steps are also included:

S141: The processing module 210 sends a horsepower control signal to the moving unit 240 of the cleaning robot according to the horsepower control information corresponding to the comparison threshold, so that the moving unit 240 can change the speed and horsepower according to the horsepower control signal; and S142: The processing module 210 sends a suction control signal corresponding to the suction control information to the cleaning module cleaning module 250 of the cleaning robot according to the suction control information corresponding to the comparison threshold, so that the cleaning module cleaning module 250 can change the suction according to the suction control signal.

In the present invention, the processing module 210 can be a chipset or processor having computing capabilities such as a central processing unit (CPU), a microprocessor control unit (MCU), or a digital signal processor, DSP), the storage module 230 may be a built-in memory of the processing module 210, or an external information storage device such as a random access memory (RAM).

In the present invention, the moving unit 240 may be a wheel set or a track set having a small motor, thereby driving the body 200 of the cleaning robot to move on the moving plane.

In the present invention, the ultrasonic module 220 is disposed at a position of the body 200 facing the moving plane, which is a front edge of or a front edge of the bottom surface of the body 200 of the cleaning robot. The cleaning module 250 can be a small dust-collecting module or roller, which includes cleaning devices that can clean dust.

In order to further describe the application of the present invention, the following examples illustrate the movement of the cleaning robot on various moving planes. The following moving planes are generally hard floors (composed of such as: tiles, marble or polished quartz bricks), wooden floors, carpets and the like, but the present invention is not limited thereto in practice:

In an embodiment of the present invention, the body 200 of the cleaning robot is driven by the moving unit 240 to move and to clean on the general hard floor, and the ultrasonic module 220 emits the ultrasonic signal to the floor to be contacted in front of the moving unit 240 of the body 200 and receives an ultrasonic reflection signal, and the ultrasonic module 220 converts the received ultrasonic reflection signal into energy information, and the processing module 210 obtains all the energy information from the ultrasonic module 220 for a predetermined period of time and accumulates the accumulated energy information. Since there are few obstacles on the general hard floor, the ultrasonic module 220 can quickly receive the ultrasonic reflection signal with high energy and convert it into energy information, so when the processing module 210 calculates the accumulated energy information, a higher accumulated energy information value is obtained. After the processing module 210 compares the accumulated energy information with the threshold comparison table in the storage module 230, it is obtained that the current accumulated energy information falls in the interval of the hard floor in the threshold comparison table. The processing module 210 sends a corresponding horsepower control signal and a suction control signal to the moving unit 240 and the cleaning module 250 respectively according to the horsepower control information and the suction control information corresponding to the hard floor in the threshold ratio of the storage module 230. The moving unit 240 maintains the current speed according to the horsepower control signal, and the cleaning module 250 also maintains the current cleaning force according to the suction control signal.

In another embodiment of the present invention, the body 200 of the cleaning robot moves and cleans on a general hard floor, and is about to enter the carpet in the front of cleaning robot, and the ultrasonic module 220 emits an ultrasonic signal to the carpet in front of the body 200 to be contacted. The body receives the ultrasonic reflection signal reflected from the carpet and converts the ultrasonic reflection signal into energy information. At this time, the processing module 210 obtains all the energy information from the ultrasonic module 220 for a predetermined period of time and accumulates the accumulated energy information. Since there are more obstacles and gaps on the carpet, the reflected ultrasonic reflection signal is slower and weaker, so when the ultrasonic module 220 coverts the ultrasonic reflection signal into energy information, the value is relatively low. After the processing module 210 compares the accumulated energy information with the threshold comparison table in the storage module 230, it is obtained that the current accumulated energy information falls in the interval of carpet in the threshold comparison table. The processing module 210 sends respectively a corresponding horsepower control signal and suction control signal to the moving unit 240 and the cleaning module 250 according to the horsepower control information and the suction control information in the table. The moving unit 240 adjusts to a larger horsepower output according to the horsepower control signal to respond to the carpet that the body 200 is about to enter. The cleaning module 250 also increases the suction according to the suction control signal to respond to the incoming carpet, so when the body 200 of the cleaning robot enters the moving plane of a different material, the cleaning robot won't get stuck due to insufficient speed or the cleaning force cannot provide enough cleaning effect due to weak cleaning force.

In still another embodiment of the present invention, the body 200 of the cleaning robot is currently moving and cleaning the carpet, and the ultrasonic module 220 emits the ultrasonic signal to the wooden floor that the body 200 is about to enter. The body 200 receives the ultrasonic reflection signal reflected from the wooden floor and converts the ultrasonic reflection signal into energy information. At this time, the processing module 210 obtains all the energy information from the ultrasonic module 220 for a predetermined period of time and accumulates the accumulated energy information. Since the obstacles and gaps of the wooden floor are between the hard floor and the carpet, so the speed and intensity of the reflected ultrasonic reflection signal are also between the normal hard floor and the carpet, when the ultrasonic module 220 coverts the ultrasonic reflection signal into energy information, the value is in the middle between those of the carpet and the hard floor. After the processing module 210 compares the accumulated energy information to the threshold comparison table in the storage module 230, it is obtained that the current accumulated energy information falls in the interval of the wooden floor in the threshold comparison table. The processing module 210 further sends a corresponding horsepower control signal and a suction control signal to the moving unit 240 and the cleaning module 250 according to the horsepower control information and the suction control information in the table. The moving unit 240 adjusts the horsepower output to be medium according to the horsepower control signal to respond to the wooden floor that the body 200 is about to enter, and the cleaning module 250 also adjusts the suction according to the suction control signal to medium intensity, thereby avoiding the possibility that when the body 200 of the cleaning robot moves from the carpet into the wooden floor, the speed is too high to provide enough cleaning effect and the cleaning force is set too strong, causing the cleaning robot to consume a lot of unnecessary power and reduces the operation durability.

The foregoing paragraphs are simply examples for explaining the material identification method of the present invention when applied to the cleaning robot, wherein the materials of the moving plane are changing between different grounds, but the present invention is not limited to the above-described examples.

The invention uses the ultrasonic module 220 to convert the ultrasonic reflection signal as an energy information, and uses the processing module 210 to calculate the accumulated energy information, thereby determining the material of the floor being cleaned by the body 200 of the cleaning robot, therefore, it has improved the shortcomings of misjudging the material due to signal problem of the ultrasonic module, and there is no misjudgment due to the slip amount or running resistance of one or more displacement wheels; besides, by using the ultrasonic waves, the present invention provides the function of judging the material which is not provided by infrared rays and improves the problem of the large blind spot caused by the infrared technique, and the present invention simplifies the process of determining the material and improves the success rate of the material judgment. In addition, the material identification method can be updated by continuously updating the threshold comparison table and the horsepower control information and the suction control information to include various materials that may be added in the future and required to be judged.

What is claimed is:

1. A material identification method suitable for a cleaning robot, wherein a storage module of the cleaning robot is preset with a threshold comparison table, and the threshold comparison table is pre-set with a plurality of comparison thresholds, each comparison threshold is an interval of a cumulative energy information accumulated by a material of the moving plane for a predetermined period of time, the material identification method comprising the following steps:
   an ultrasonic module of the cleaning robot emitting an ultrasonic signal to a moving plane contacted by at least one moving unit provided by the cleaning robot;
   the ultrasonic module receiving an ultrasonic reflection signal from the moving plane that reflects the ultrasonic signal;
   the ultrasonic module converting the ultrasonic reflection signal into an energy information;
   a processing module of the cleaning robot being configured to calculate the accumulated energy information accumulated by all the energy information in the predetermined period of time; and
   the processing module determining, according to the threshold comparison table, whether the accumulated energy information corresponds to one of the comparison thresholds, and determining the material of the moving plane contacted by the moving unit.

2. The material identification method as claimed in claim 1, wherein the threshold comparison table is respectively provided with a horsepower control information and a suction control information corresponding to each one of the comparison thresholds, and after the processing module determines the material of the moving plane contacted by the moving unit, the method comprising:
   sending a horsepower control signal corresponding to the horsepower control information by the processing module to the moving unit of the cleaning robot according to the horsepower control information corresponding to the comparison threshold, wherein the moving unit changes the horsepower according to the horsepower control signal; and
   sending a suction control signal corresponding to the suction control information by the processing module to a cleaning module of the cleaning robot according to the suction control information corresponding to the comparison threshold, wherein the cleaning module changes the suction according to the suction control signal.

3. The material identification method as claimed in claim 1, wherein the energy information can be a voltage value or a current value.

4. The material identification method as claimed in claim 3, wherein the accumulated energy information can be an accumulated voltage value or an accumulated current value.

5. A cleaning robot comprising:
   a body;
   a storage module disposed in the body, wherein the storage module is preset with a threshold comparison table, and the threshold comparison table is pre-set with a plurality of comparison thresholds, each comparison threshold is an interval of a cumulative energy information accumulated by a material of the moving plane for a predetermined period of time;
   at least one moving unit disposed at a bottom of the body, the moving unit driving the body to move and contacting a moving plane;
   an ultrasonic module disposed at a position of the body facing the moving plane, the ultrasonic module emitting an ultrasonic signal to the moving plane, and receiving an ultrasonic reflection signal from the moving plane that reflects the ultrasonic signal, and the ultrasonic module converting the ultrasonic reflection signal into an energy information; and
   a processing module disposed in the body, and connected to the storage module, the moving unit, and the ultrasonic module, the processing module receiving all the energy information in the predetermined period of time, and calculating the accumulated energy information accumulated by all the energy information in the predetermined period of time, and finding out one of the comparison thresholds corresponding to the accumulated energy information according to the threshold comparison table, and determining the material of the moving plane contacted by the moving unit, and the processing module sending a horsepower control signal to the moving unit, so that the moving unit moving unit changes the horsepower according to the horsepower control signal.

6. The cleaning robot as claimed in claim 5, wherein the position of the body facing the moving plane is a front edge of the body or a front edge of the bottom.

7. The cleaning robot as claimed in claim 5, wherein the cleaning robot further comprises:
   a cleaning module disposed at the bottom of the body and connected to the processing module for cleaning the moving plane below the body.

8. The cleaning robot as claimed in claim 7, wherein the threshold comparison table in the storage module is respectively provided with a horsepower control information and a suction control information corresponding to each one of the comparison thresholds;

after the processing module determines the material of the moving plane contacted by the moving unit, the processing module sends a horsepower control signal corresponding to the horsepower control information to the moving unit of the cleaning robot according to the horsepower control information corresponding to the comparison threshold, so that the moving unit changes the horsepower according to the horsepower control signal; and the processing module sends a suction control signal corresponding to the suction control information to a cleaning module of the cleaning robot according to the suction control information corresponding to the comparison threshold, wherein the cleaning module changes the suction according to the suction control signal.

9. The cleaning robot as claimed in claim 5, wherein the energy information can be a voltage value or a current value.

10. The cleaning robot as claimed in claim 9, wherein the accumulated energy information can be an accumulated voltage value or an accumulated current value.

* * * * *